ated May 9, 1961

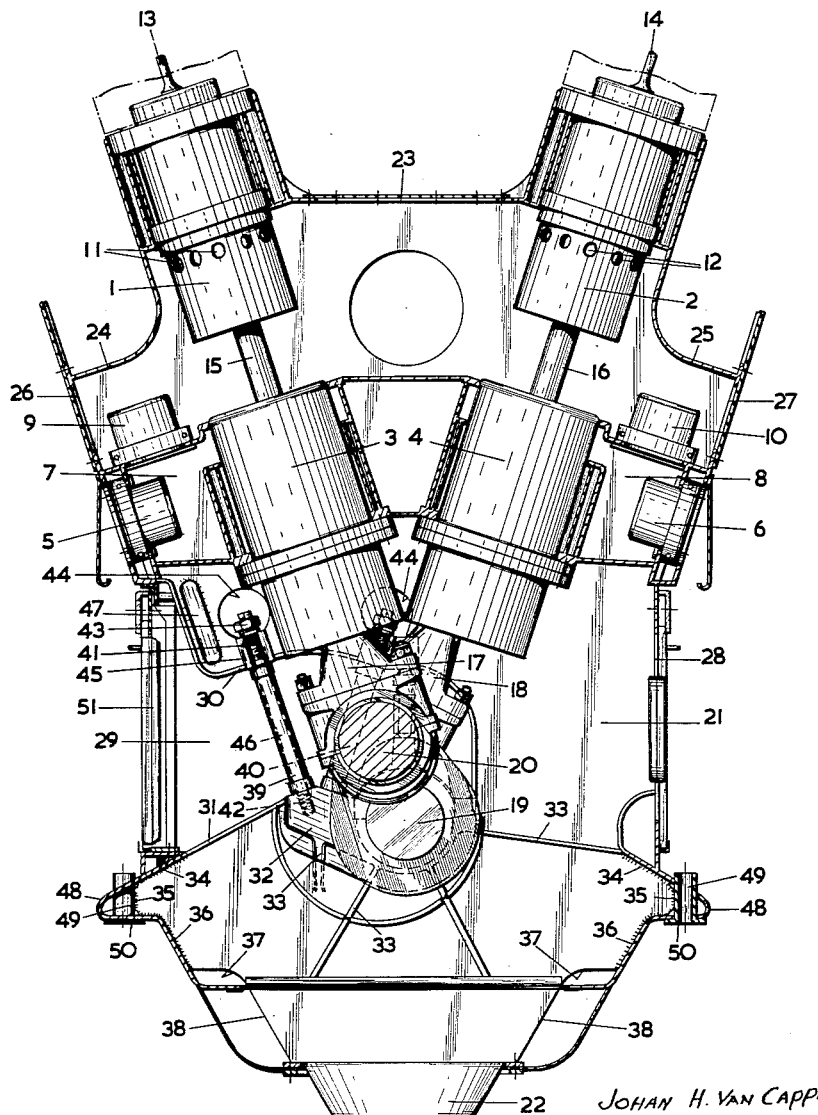

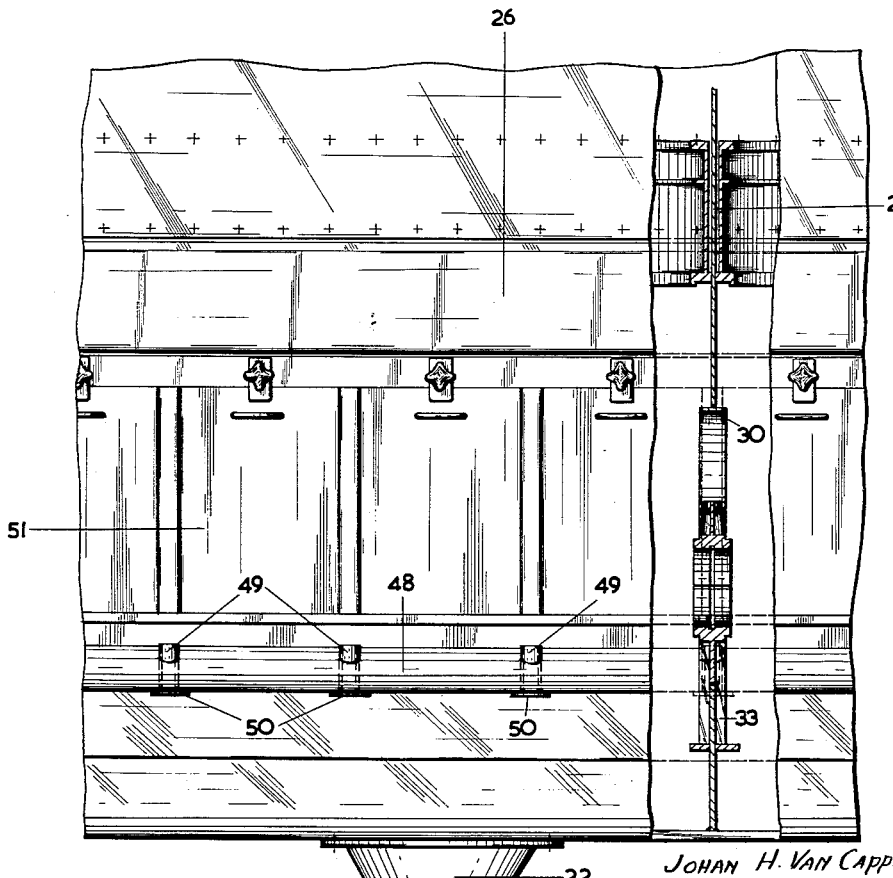

United States Patent Office

2,983,258
RECIPROCATING ENGINE FRAME

Johan Hendrik van Cappellen, Krimpen Aan de Lek, and Joan van Vollenhoven, Eindhoven, Netherlands, assignors to N. V. Machinefabriek "Bolnes" Voorheen J. H. van Cappellen, South Holland, Netherlands, a corporation of the Netherlands Filed Feb. 9, 1959, Ser. No. 792,132

Claims priority, application Netherlands Feb. 11, 1958

4 Claims. (Cl. 121—194)

This invention relates to a reciprocating engine, in particular an internal combustion engine with a welded frame, the main parts of which consist of parallel main frame elements in the shape of plates extending parallel to the axes of the cylinders, between which plates the cylinders are disposed.

It is an object of this invention to improve the structure and design of such engines in the zone in the proximity of the crank shaft. In this zone the requirements as to strength in operation, stability and the possibility of assembly and disassembly of parts are quite severe. It should be possible to remove the crank shaft without dismantling the whole engine and even to weld the engine together so that no dismantling of the frame is possible, this making it unavoidable that the crank shaft be inserted and removed without dismantling the frame. In engines of the given kind with a welded frame as indicated above it is known to provide openings in the frame plates giving access to the space in which the crank shaft is taken up in order to allow the crank shaft to be inserted and removed. Such an opening gives a considerable weakening of the frame plates and particular measures are required to bridge the opening so that the frame plates are adapted to transmit the forces from the combustion and compression in the engine and from the moving parts in an adequate manner.

In this same zone the frame has to be supported on a base or similar stationary structure. It has appeared that it is of the utmost importance that both the bridging of the openings in the frame plates and the part of the engine resting upon and secured to a base plate or the like are of sufficient strength and rigidity. Both problems should be solved in unison to obtain an adequate engine with sufficient strength and a long life.

To obtain these ends the invention provides a reciprocating engine with a welded frame, the main parts of which being shaped as frame plates extending parallel to one another perpendicular to the crank shaft axis and parallel to the cylinder axes, said frame plates being provided with an opening extending from one side edge to the seat for the crank shaft so that the crank shaft may be introduced and removed through said opening, said frame plates taking up the working cylinders between them, a plate like member extending in a direction parallel to the axis of the crank shaft in the zone of mounting the frame on a base and being folded about parts of the said frame plates which extend in parallel with the cylinder axes to constitute a stiffening longitudinal beam in the engine connecting the frame plates and extending from its end closest to the working cylinders first outwardly, then bends back into a part which extends inwardly substantially horizontally and is adapted to constitute the supporting surface of the engine on the base and thereafter extends downwardly and inwardly towards the oil sump.

The means bridging the opening for the crank shaft in the frame plates are preferably constituted by stud bolts screwed into a widened part along the lower edge of the opening and connected to the upper edge of the opening by a nut screwed upon it and resting against a suitable surface at such upper edge of the opening. The opening is bridged moreover by a sleeve surrounding the stud bolt and fitting between opposite edges of the opening. When the nut is screwed tightly on the stud bolt the stud bolt is under tensile stress and the sleeve is compressed. This gives a suitable bridging under pretension so that forces alternating in direction are taken up without causing clearances, wear and rattling.

The present invention particularly provides for a suitable embodiment of such a structure for an engine with the axes of the cylinders in the shape of a V. In this case according to the invention the opening is bridged by two bridging connections taking up tensile and compression forces and making an angle with one another. Preferably the axes of the two connections extend about in the same direction as the axes of the cylinders so that the connections also constitute a V with the apex at the lower end of the engine.

The invention will now be described in connection with the attached drawings. In these drawings:

Figure 1 gives a sectional view of the lower part of the frame and other essential parts of an internal combustion engine according to the invention with the cylinders in V-formation in a plane perpendicular to the axis of the crank shaft.

Figure 2 gives a side elevation, partly longitudinal section of part of the engine according to Figure 1.

The engine being a two-stroke internal combustion engine with cross-heads comprises a number of cylinders in two rows, said rows being mutually in V-arrangement. The cylinder linings 1 and 2 and cross head-guides 3 and 4 are shown in view from the outside. The crossheads are cylindrical pistons acting as scavenging pumps, the scavenging air entering through suction valves 5 and 6 into receivers 7 and 8 and issuing therefrom through outlet valves 9 and 10 towards inlet ports 11 and 12 in the cylinder linings 1 and 2, the combustion gases from the cylinders being exhausted through outlet valves 13 and 14. The piston rods 15 and 16 connect pistons and crossheads. Connecting rods 17 and 18 connect the crank shaft 19 to the cross heads, both connecting rods engaging a same crank pin 20 as is usual for engines with the cylinders in V-arrangement.

The frame of this engine is made by welding and to this end frame plates 21 are arranged parallel to one another and perpendicularly to the crank shaft axis. The plates 21 extend downwardly to the lower oil pump 22 and upwardly to the top of the cylinders 1 and 2. Between the cylinders the top edge of the plates 21 is indicated by 23. The plates are further bordered by curved edges 24 and 25, above which the cam shaft with fuel injection pumps and push rods for the cylinder outlet valves are arranged. The side edges 26 and 27 border the plates 21 further down and at the right as seen in Figure 1 the plates have a vertical edge 28. At the left there is in each plate an opening 29 from the side extending towards and including the space for the crank shaft 19 and allowing removal and insertion thereof. Transverse strips 30 and 31 are welded to the plates 21 alongside the opening. A block 32 thick in the direction of the crank shaft is welded to each plate 21 and forms the support for the lower crank shaft bearing, said block being supported rigidly on the plate 21 by strut webs 33. The plates 21 extend further downwardly as shown, having edge parts 34, 35, 36, 37 and 38.

The opening 29 is bridged by two connections 39 and 40 each parallel to one of the cylinder axes and in V-arrangement. Said connections include a tie rod 41 in the shape of a stud bolt screw-threaded at its ends, engaging at its lower end in a screw-threaded bore 42 in block 32 and at its upper end a nut 43 is screwed upon it in a circular recess 44 in the plate 21. A fork-shaped member 45 takes up the rod 41 between its fork prongs to allow insertion and removal of said rod. A sleeve or tube 46 fits between opposite edges of the opening 29 and surrounds each tie rod 41. Thus when tightening the nut 43 the rod 41 is brought under tension and the sleeve 46 under compression, thus giving a pretensioned connection bridging the opening 29. Strips 47, only one of which is shown in Figure 1, are welded to plate 21 to both sides of recesses 44 for compensating the weakening by said recesses.

It has appeared from experiments that a connection 39, 40 as described gives a very good result, also in engines with the cylinders in one row only. The arrangement in a V and parallel to the cylinder axes has appeared in experiments to be very useful in V-engines for transmitting the forces adequately.

Plates 48 extend entirely lengthwise of the engine along both sides thereof. They are welded as shown to edges 34 and 36 of the plates 21. Bosses 49 extend through the plates 21 exactly with their axes in the plane of the plates 21 and are welded to said plates 48 where they pass through them in upper and lower parts and to the plate 21 at 35. Washer plates 50 are welded around and to the lower end of the bosses 49 and are suitably planed to constitute supporting surfaces, with which the engine rests upon its abse structure. Bolts may be passed through the bosses 49 to secure the engine to said base structure.

The described provision of the bosses 49 in the plane of the plates 21 makes it superfluous to provide two bolts at each side of the engine to both sides of the plates 21.

Figure 2 shows a unitary removable cover 51 for closing the crank case.

What we claim is:

1. A welded frame for a reciprocating piston engine having successive cylinders with pistons connected to a crank shaft, said frame comprising a plurality of frame plates extending parallel to one another, perpendicular to the crank shaft axis and parallel to the cylinder axes, each of said frame plates being provided with an opening extending from one side edge thereof to the bearing for the crank shaft so that the crank shaft may be introduced and removed through said openings, successive frame plates embracing successive cylinders between them, a plate-like member extending along the mounting region of the frame in a direction parallel to the axis of the crank shaft, said member being folded about lateral parts of said frame plates to constitute a longitudinal stiffening beam connecting the frame plates, said member extending from its upper longitudinal edge first outwardly, then back inwardly substantially horizontally to constitute a mounting surface of the engine, and thereafter downwardly and inwardly towards an oil sump of the engine, said lateral parts of the frame plates terminating short of and being spaced from the outward extremities of said member, each of said frame plates having a vertical sleeve welded to a lateral extremity thereof and to the folded plate-like member, said sleeves permitting bolts to pass therethrough for mounting the frame.

2. The frame of claim 1, a washer disk being welded around the underside of each sleeve and to the underside of the plate-like member to constitute a mounting rest surface for the engine.

3. A welded frame for a reciprocating piston engine having successive pairs of cylinders with their axes in V-arrangement and with pistons connected to a crank shaft, said frame having frame plates extending parallel to one another, perpendicular to the crank shaft axis and parallel to the cylinder axes, each of said frame plates being provided with an opening extending from one side edge thereof to the bearing for the crank shaft so that the crank shaft may be introduced and removed through said openings, successive frame plates embracing successive cylinders between them, and two pretensioned push-pull connections bridging each plate opening at different inclinations, said connections being respectively parallel to the axes of the pairs of cylinders in V-arrangement.

4. The frame of claim 3, further comprising a plate-like member extending along the mounting region of the frame in a direction parallel to the axis of the crank shaft, said member being folded about lateral parts of said frame plates to constitute a longitudinal stiffening beam connecting the frame plates, said member extending from its upper longitudinal edge first outwardly, then back inwardly substantially horizontally to constitute a mounting surface of the engine, and thereafter downwardly and inwardly towards an oil sump of the engine, said lateral parts of the frame plates terminating short of and being spaced from the outward extremities of said member, each of said frame plates having a vertical sleeve welded to a lateral extremity thereof and to the folded plate-like member, said sleeves permitting bolts to pass therethrough for mounting the frame.

References Cited in the file of this patent

UNITED STATES PATENTS

| 1,185,951 | Sturtevant | June 6, 1916 |
| 1,291,313 | Weiss | Jan. 14, 1919 |
| 1,408,179 | Du Pont | Feb. 28, 1922 |
| 1,554,162 | Lanzerotti-Spina | Sept. 15, 1925 |
| 1,996,211 | Mutchler | Apr. 2, 1935 |
| 2,030,995 | Loeffler | Feb. 28, 1936 |
| 2,287,399 | Ware et al. | June 23, 1942 |
| 2,334,916 | Ford et al. | Nov. 23, 1943 |
| 2,486,927 | Chapman et al. | Nov. 1, 1949 |

FOREIGN PATENTS

| 5,536 | Great Britain | Dec. 12, 1907 |
| 396,742 | Great Britain | Aug. 2, 1933 |
| 744,475 | France | Apr. 20, 1933 |